United States Patent [19]

Krükemeier et al.

[11] 4,249,651
[45] Feb. 10, 1981

[54] RECLAIMING BUCKETS FOR A STOCKPILE RECLAIMER

[75] Inventors: Richard Krükemeier, Porta Westfalica; Uwe Merten, Bielefeld; Willi Stahlmann, Bad Oeynhausen, all of Fed. Rep. of Germany

[73] Assignee: Weserhütte AG, Fed. Rep. of Germany

[21] Appl. No.: 17,334

[22] Filed: Mar. 5, 1979

[30] Foreign Application Priority Data

Mar. 11, 1978 [DE] Fed. Rep. of Germany ....... 2810599

[51] Int. Cl.³ ............................................. B65G 65/02
[52] U.S. Cl. ................................................. 198/509
[58] Field of Search ............... 198/509, 713, 714, 307; 37/118 R, DIG. 2; 414/722

[56] References Cited

U.S. PATENT DOCUMENTS

| | | | |
|---|---|---|---|
| 3,195,747 | 7/1965 | Kashergen | 37/DIG. 2 |
| 4,009,531 | 3/1977 | Metrier | 198/509 |
| 4,057,139 | 11/1977 | Mausolf et al. | 198/509 |

Primary Examiner—James L. Rowland
Attorney, Agent, or Firm—James E. Bryan

[57] ABSTRACT

An improvement in a double bucket attached at the circumference of a bucket wheel or of a bucket drum for a stockpile reclaimer is disclosed, the double bucket being adapted to revolve in a circular path and effective in picking up material in either direction of rotation of the bucket wheel or bucket drum, and being provided with scraper blades connected to parallel side walls or partition walls of the bucket, and with a bucket backplate pivotally supported at the side walls or partition walls of the bucket by means of a shaft or stub shafts, the bucket backplate being capable of pivoting within the space of the bucket and thus acting in the same manner for both directions of rotation to carry collected stockpile material upwardly either on one face or on the other, depending upon the direction of rotation, the improvement being at least one brake connected on one side of the shaft of the bucket backplate and on the other side to the side wall of the bucket, whereby the bucket backplate is prevented from pivoting due to the influence of its own weight.

2 Claims, 2 Drawing Figures

RECLAIMING BUCKETS FOR A STOCKPILE RECLAIMER

This invention relates to double buckets, incapable of being swung over, attached at the circumference of a bucket wheel or of a bucket drum for a stockpile reclaimer, which buckets revolve in a circular path and are effective in picking up material in either direction of rotation of the bucket wheel or bucket drum. The buckets are provided with scraper blades which are connected to the parallel side walls or partition walls of the buckets; and with a bucket backplate rotatably supported at the side walls or partition walls of the bucket by means of a shaft or stub shafts. The bucket backplates are capable of being swung over within the space of the bucket and thus act in the same manner for both directions of rotation to carry the collected stockpile material upwardly either on one face or else on the other, depending upon the direction of rotation.

The collection of bulk material lying on the stockpile, by means of stockpile reclaimers equipped with a bucket wheel or bucket drum is accomplished by buckets composed of blades cutting into the bulk material, of bucket backplates, and of side walls or partition walls. Buckets of this kind are interchangeably attached by means of bolts or similar units at the circular structural member of the bucket wheel or at the barrel of the bucket drum. When the stockpile reclaimer always works in the same direction at the face of the stockpile, it is sufficient to construct the buckets in such a manner that they are capable of working only in one direction of rotation and that their blades always cut into the bulk material in the same direction.

However, the stockpile bed is frequently so shaped or so to be utilized that the bucket wheel or the bucket drum must be capable of picking up the bulk material equally effectively in both directions of rotation. The buckets then must be constructed in accordance with this requirement.

For this purpose preferably there have been utilized in most recent times, double buckets incapable of being swung over provided with double blades that cut to both sides. Such a double bucket with a backplate that can be swung over is disclosed in DT-OS No. 25 09 441.9.

With pickup buckets of that kind having swingable bucket backplates there exists the disadvantage that the swingable bucket backplates flip over suddenly under the action of their own weight after emptying, as soon as the uppermost position of the bucket has been passed through during revolution of the buckets and the buckets commence to move downwardly. the flipping-over of the plates (flaps) is accompanied by a considerable amount of noise.

In order to suppress the noise, the attempt already has been made to utilize for the backplates either rubber or plastic-material plates or also metal plates sheathed with rubber or plastic material. However, plates (flaps) of this kind attain only a slight reduction of the noise nuisance as compared with a simple metal plate. Also, the attempt has been made to provide shock-absorbing buffers which the plates (flaps) strike when they flip over. But this approach did not attain the required noise reduction either.

It is, therefore, the object of the present invention to construct the known kind of double bucket in such a manner that not only the swinging-over of the bucket backplate without the influence of external forces but also sudden swinging-over of the bucket backplate with the influence of external forces is prevented in order to reduce the noise to a minimum, or to eliminate it completely.

According to the invention the desired object is achieved in this manner in that at least one braking device, which is connected on one side to the shaft of the bucket backplate and on the other side with the side wall of the bucket prevents the bucket backplate from being swung over with the action of external forces, and the brake force which prevents the bucket backplate from swinging-over can be regulated.

This solution provides the advantage that the bucket backplate in the double bucket, which rotates around a horizontal axis, is no longer swung over by its own weight during each revolution after the uppermost position or lowest position has been passed through. Only when the working direction of the stockpile reclaimer and with it the direction of rotation of the bucket wheel and bucket drum change is the bucket backplate swung over by the action of the bulk material that is picked up. Because the braking device substantially slows down the swinging-over of the bucket backplate, noise otherwise ensuing from the swinging-over of the bucket backplate is completely eliminated.

A braking device of this kind may be, as is described by way of example in the following text, a conventional adjustable and readjustable spring-pressure-operated slip clutch (torque overload clutch) or slip brake, preferably of the multi-disc type.

The same effect also may be otained by means of brakes of other types of construction possessing brake shoes. The braking action, moreover, can be obtained by arrestment with conical clamping or even by means of magnets either permanent or electrically activated.

The invention will be further illustrated by reference to the accompanying drawings, in which.

Figure 1:
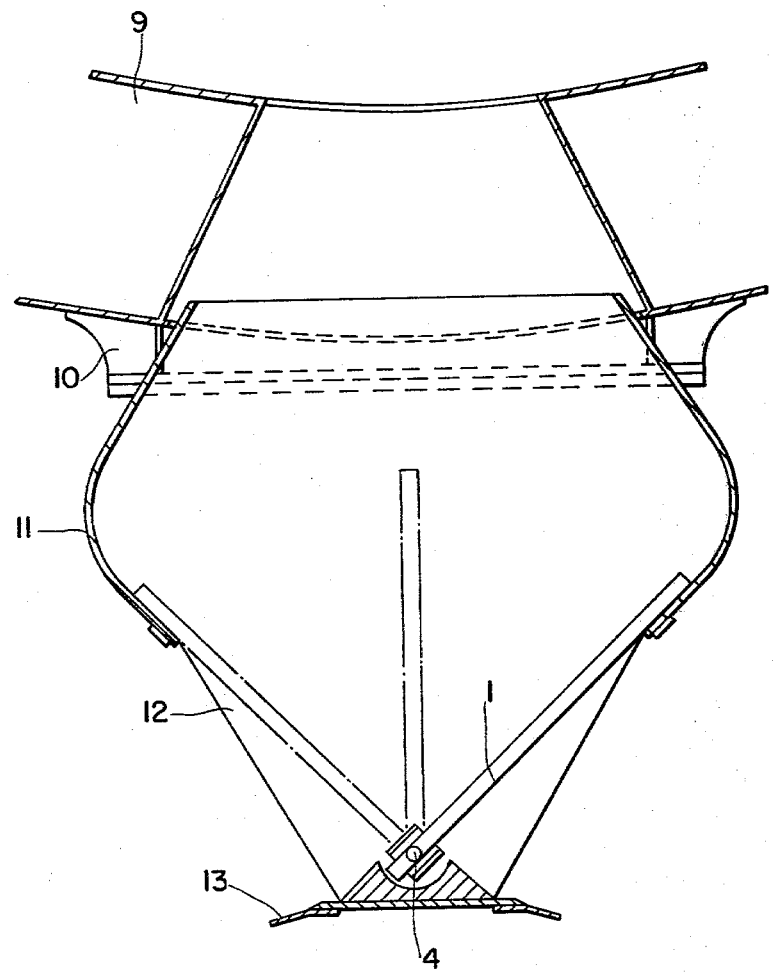
FIG. 1 is a cross-section through a double bucket.

As shown in FIG. 1, the double bucket 11 with its side-walls 12 is interchangeably attached to the bucket drum or the bucket wheel 9 by a rigid or flexible bucket fastening device. The scraper blades 13 are arranged at the lower end between the side walls 12.

The bucket backplate 1 is supported by means of the supporting shaft 4 or appropiate stub shafts in or at the side walls or partition walls 12 of the double bucket 11, so as to be capable of being swung over within the space of the bucket.

Figure 2:
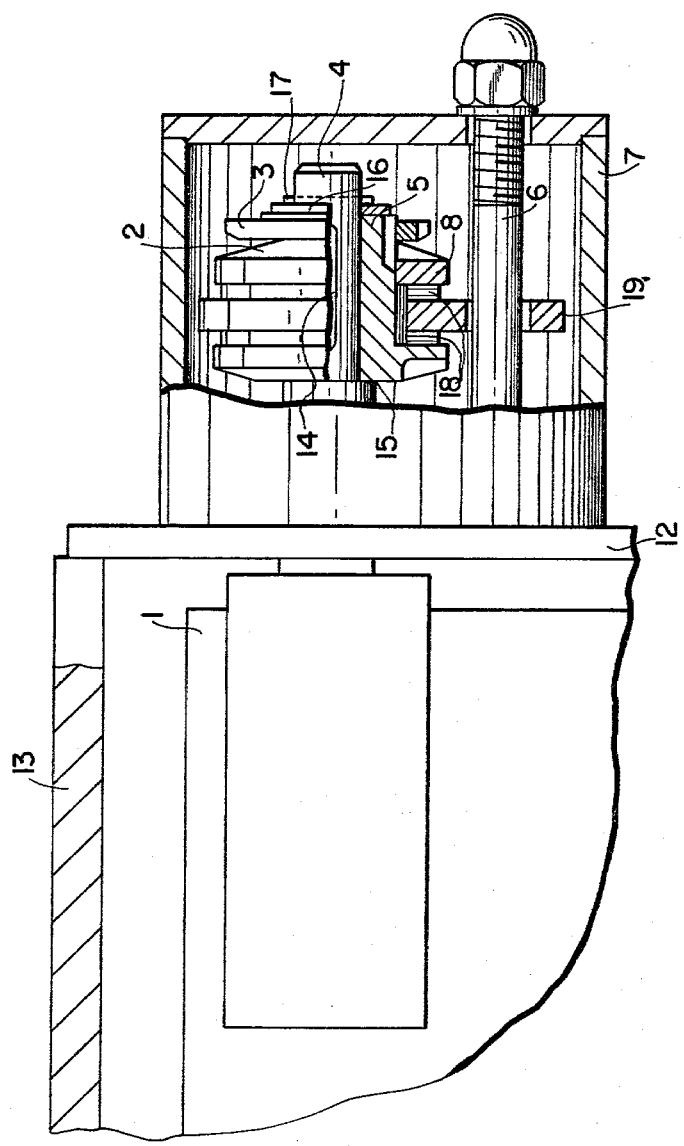
FIG. 2 is the arrangement of a braking device.

The braking device located on the supporting shaft 4 is represented in FIG. 2 as a slip clutch. The clutch hub 5, which is provided with a flange, is held against rotation on the supporting shaft 4 by the adjusting spring 14 and secured against axial displacement by a shoulder at one end of the supporting shaft 4 and at the other end by a washer 16 and cotter pin 17. The lining disc 19 fitted on both sides with the clutch lining 18 and mounted between the flange of the clutch hub 5 and the clutch disc 8 braces itself to avoid torsion against the torque stay which is supported at one end in the side wall 12 and at the other end in the supporting casing 7 that is attached to the side wall 12.

The clutch disc 8 can be shifted in an axial direction on the clutch hub 5 and is pressed against the lining disc 19 by the cup springs 2. The cup springs may be preloaded by means of the adjusting nut 3 on the hub.

The most favorable slipping moment of the slip clutch for any particular case is set up, by variation of the spring load. When the clutch linings (facings) have become worn, the slipping moment may be readjusted.

The concept of the invention is independent of the mounting of the double buckets. As disclosed in DT-OS No. 25 09 441, they can be attached to the bucket wheel drum shell so that they can be tilted slightly, or else rigidly fastened to the bucket wheel or drum shell. In the latter case, the scraper blades can be tilted easily in relation to the bucket body.

It will be obvious to those skilled in the art that many modifications may be made within the scope of the present invention without departing from the spirit thereof, and the invention includes all such modifications.

What is claimed is:

1. In a double bucket attached at the circumference of a bucket wheel or of a bucket drum for a stockpile reclaimer, adapted to revolve in a circular path and effective in picking up material in either direction of rotation of the bucket wheel or bucket drum, and which is provided with scraper blades connected to parallel side walls or partition walls of the bucket; and with a bucket backplate pivotally supported at the side walls or partition walls of the bucket by means of a shaft or stub shafts, the bucket backplate being capable of pivoting within the space of the bucket and thus acting in the same manner for both directions of rotation to carry collected stockpile material upwardly either on one face or on the other, depending upon the direction of rotation, the improvement comprising at least one braking means connected on one side to the shaft of the bucket backplate and on the other side to the side wall of the bucket, whereby the bucket backplate is prevented from pivoting due to the influence of its own weight.

2. A braking device according to claim 1, including means whereby the braking force is adjustable.

* * * * *